United States Patent
Peacock et al.

(10) Patent No.: US 8,150,637 B2
(45) Date of Patent: Apr. 3, 2012

(54) GAS LIFT WELL SURVEILLANCE

(75) Inventors: Larry Peacock, Katy, TX (US); Dan Dees, Katy, TX (US)

(73) Assignee: WellTracer Technology, LLC, Katy, TX (US)

( * ) Notice: Subject to any disclaimer, the term of this patent is extended or adjusted under 35 U.S.C. 154(b) by 259 days.

(21) Appl. No.: 12/696,757

(22) Filed: Jan. 29, 2010

(65) Prior Publication Data

US 2010/0198533 A1  Aug. 5, 2010

Related U.S. Application Data

(60) Provisional application No. 61/149,814, filed on Feb. 4, 2009.

(51) Int. Cl.
*G06F 19/00* (2011.01)

(52) U.S. Cl. ......... 702/47; 702/2; 702/6; 702/9; 702/12; 702/50; 702/182; 73/861.05; 166/250.15; 166/372; 166/373

(58) Field of Classification Search ............... 702/2, 6, 702/9, 12, 47, 50, 182; 73/861.05; 166/250.15, 166/372, 373
See application file for complete search history.

(56) References Cited

U.S. PATENT DOCUMENTS

| | | | |
|---|---|---|---|
| 4,972,704 | A | 11/1990 | Wellington et al. |
| 5,031,697 | A | 7/1991 | Wellington et al. |
| 5,063,772 | A | 11/1991 | Wellington et al. |
| 2003/0024704 | A1* | 2/2003 | Hirsch et al. ............ 166/313 |

OTHER PUBLICATIONS

Richardson, E.A.; Simmons, J.F., Welling, S.L., "An On-Line Method for Troubleshooting Gas-Lift Wells Without Wireline Tools," 68th Annual Technical Conference and Exhibition of the Society of Petroleum Engineers, Oct. 3-6, 1993 in Houston, Texas, USA; Society of Petroleum Engineeris 26593 Erratum; pp. 821-830.

* cited by examiner

*Primary Examiner* — Sujoy Kundu
(74) *Attorney, Agent, or Firm* — D'Ambrosio & Menon, PLLC

(57) ABSTRACT

Apparatuses, methods, and computer program products for evaluating the performance of a gas lift well are disclosed. A gas lift well surveillance kit is disclosed. A method for evaluating the performance of a gas lift well includes injecting a tracer into an annulus, measuring a concentration of the tracer present in a substance retrieved from the well, determining actual travel times of the tracer, segmenting the gas lift well into a plurality of ranges of well depth, determining lift gas loss parameters, calculating lift gas velocities in the annulus and in the production tubing for each of the plurality of ranges of well depth based on the lift gas loss parameters, and determining points of entry of the lift gas into the production tubing based on: (i) the actual travel times of the tracer, and (ii) the lift gas velocities in the annulus and in the production tubing.

25 Claims, 7 Drawing Sheets

GAS LIFT WELL SURVEILLANCE

PRIORITY

This application is based on and claims the benefit of priority from U.S. Provisional Application, Ser. No. 61 149,814, filed Feb. 4, 2009.

BACKGROUND

Various processes are employed to assist in retrieving oil, water, or a mixture of various fluids from wells when a lack of sufficient reservoir pressure limits well production. One such technique, known as "gas lift," involves injecting a gas into an annulus formed between the well casing and the production tubing within a wellbore. In gas lift wells, gas-lift mandrels having gas-lift valves that are operatively connected thereto are typically installed in the production tubing of the well. Variation between tubing and casing pressures may cause a gas-lift valve to open and close, thereby allowing gas to be injected into the fluid(s) to be retrieved from the well. The injected gas forms air pockets within the fluid and assists in lifting the fluid from the subterranean reservoir and through the wellbore. The invention relates to methods and systems for evaluating the performance of a gas lift well. More specifically, the invention relates to methods and systems for determining points of entry of lift gas into the production tubing within a gas lift well.

SUMMARY

One or more embodiments of the invention are directed to methods, systems, and/or computer program products for determining one or more points of entry of a lift gas from an annulus of a well casing into the production tubing. The points of entry of the lift gas may correspond to entry of the lift gas through gas-lift valves or entry of the lift gas into the production tubing as a result of leaks in the production tubing.

In an embodiment of the invention, a method for evaluating the performance of a gas lift well includes injecting a tracer into an annulus formed between a well casing and a production tubing of the gas lift well. The annulus has a lift gas injected therein, and the gas lift well further includes one or more points of communication between the annulus and the production tubing, each of the one or more points of communication corresponding to a valve position. The method further includes measuring, over a period of time, a concentration of the tracer present in a substance retrieved from the gas lift well, determining one or more actual travel times of the tracer based on a deviation of the concentration of the tracer measured over the period of time from a pattern present in a baseline tracer concentration, each of the one or more actual travel times of the tracer corresponding to a point of entry of one or more points of entry of the lift gas into the production tubing, segmenting the gas lift well into a plurality of ranges of well depth, determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry, calculating a velocity of the lift gas in the annulus and a velocity of the lift gas in the production tubing for each of the plurality of ranges of well depth based on the one or more lift gas loss parameters, and determining one or more points of entry of the lift gas into the production tubing based on: (i) the one or more actual travel times of the tracer, and (ii) the velocity of the lift gas in the annulus and the velocity of the lift gas in the production tubing that are calculated for each of the plurality of ranges of well depth.

In another embodiment of the invention, the velocity of the lift gas in the annulus is calculated for each of the plurality of ranges of well depth further based on at least one of: (i) a plurality of pressures in the annulus, each of the plurality of pressures corresponding to one of the plurality of ranges of well depth, (ii) a flow rate of the lift gas in the annulus, (iii) an injection pressure of the lift gas, (iv) a volume of the annulus per a unit of well depth, (v) a temperature in the annulus, (vii) a parameter that represents a frictional force opposing flow in the annulus, and (viii) a parameter that represents an effect of gravity on flow in the annulus.

In another embodiment of the invention, the velocity of the lift gas in the production tubing is calculated for each of the plurality of ranges of well depth further based on at least one of: (i) a plurality of pressures in the production tubing, each of the plurality of pressures corresponding to one of the plurality of ranges of well depth, (ii) a flow rate of the lift gas in the production tubing, (iii) a temperature in the production tubing, (iv) a parameter that represents a frictional force opposing flow in the production tubing, (v) a parameter that represents an effect of gravity on flow in the production tubing, (vi) a ratio of a gaseous phase to a non-gaseous phase in the substance retrieved from the gas lift well, (vii) a flow rate of one or more gases present in the substance retrieved from the gas lift well, (viii) a flow rate of one of more liquids present in the substance retrieved from the gas lift well, (ix) a well head pressure, and (x) a separator pressure.

In another embodiment of the invention, a method for evaluating the performance of a multiple installation gas lift well includes injecting a tracer into an annulus formed between a well casing and two or more production tubings of the gas lift well. The annulus includes a lift gas and the two or more production tubings are capable of fluid communication with the annulus and substantially incapable of fluid communication with each other. The gas lift well further includes one or more points of communication between the annulus and each of the two or more production tubings, each of the one or more points of communication corresponding to a valve position. The method further includes, for each of the two or more production tubings: measuring, over a period of time, a concentration of the tracer present in a substance retrieved from the each of the two or more production tubings, determining one or more actual travel times of the tracer based on a deviation of the concentration of the tracer measured over the period of time from a pattern present in a baseline tracer concentration, each of the one or more actual travel times of the tracer corresponding to a point of entry of one or more points of entry of the lift gas into the each of the two or more production tubings, segmenting the gas lift well into a plurality of ranges of well depth, determining one or more lift gas loss parameters, each of the one or more lift gas parameters corresponding to a point of entry, each of the one or more lift gas loss parameters accounting for an effect of entry of a portion of the tracer into the each of the two or more production tubings at the corresponding point of entry on the actual travel time of the tracer that enters the each of the two or more production tubings at each point of entry located at a depth greater than the corresponding point of entry, calculating a velocity of the lift gas in the annulus and a velocity of the lift gas in the each of the two or more production tubings for each of the plurality of ranges of well depth based on the one or more lift gas loss parameters, and determining the one or more points of entry of the lift gas into the each of the two or more production tubings based on: (i) the one or more actual travel times of the tracer, and (ii) the velocity of the lift gas in the annulus and the velocity of the lift gas in the each of the two or more production tubings calculated for each of the plurality of ranges of well depth.

In another embodiment of the invention, a gas lift well surveillance kit includes components for evaluating the performance of a gas lift well. The components include a separator, a tracer measurement device, a device for sensing and measuring pressure and temperature, a flow regulation device, a device for collecting and storing data, and a computer program for evaluating the performance of the gas lift well embodied on a computer-readable medium.

In another embodiment of the invention, a computer-readable medium storing a computer program for evaluating the performance of a gas lift well is disclosed. The gas lift well includes a well casing, a production tubing, an annulus formed between the well casing and the production tubing, the annulus including a lift gas, and one or more points of communication between the annulus and the production tubing, each of the one or more points of communication corresponding to a valve position. The computer program includes instructions for: measuring, over a period of time, a concentration of the tracer present in a substance retrieved from the gas lift well, determining one or more actual travel times of the tracer based on a deviation of the concentration of the tracer measured over the period of time from a pattern present in a baseline tracer concentration, each of the one or more actual travel times of the tracer corresponding to a point of entry of one or more points of entry of the lift gas into the production tubing, segmenting the gas lift well into a plurality of ranges of well depth, determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry, calculating a velocity of the lift gas in the annulus and a velocity of the lift gas in the production tubing for each of the plurality of ranges of well depth based on the one or more lift gas loss parameters, and determining one or more points of entry of the lift gas into the production tubing based on: (i) the one or more actual travel times of the tracer, and (ii) the velocity of the lift gas in the annulus and the velocity of the lift gas in the production tubing that are calculated for each of the plurality of ranges of well depth.

In one or more of the previously disclosed embodiments, the one or more determined points of entry of the lift gas may be compared to the one or more points of communication in order to determine, for each of the one or more determined points of entry of the lift gas, whether the point of entry corresponds to a leak of the lift gas into the production tubing or entry of the lift gas into the production tubing through a valve.

In one or more of the previously disclosed embodiments of the invention, a travel time of the tracer may be calculated for each of the one or more points of communication between the annulus and the production tubing based on the velocity of the lift gas in the annulus and the velocity of the lift gas in the production tubing calculated for each of the plurality of ranges of well depth. Further, a graphical representation of the concentration of the tracer measured over the period of time may be displayed on an output device. The graphical representation may provide an indication of the travel time of the tracer calculated for each of the one or more points of communication between the annulus and the production tubing.

In one or more of the previously disclosed embodiments, the graphical representation may include one or more peaks in the concentration of the tracer measured over the period of time, each of the one of more peaks corresponding to one of the one or more actual travel times, one of the one or more points of entry of the lift gas into the production tubing, and one of the one or more lift gas loss parameters. Further, the one or more lift gas loss parameters may he determined by: (i) determining an area under each of the one or more peaks, (ii) summing each area determined for each of the one or more peaks to obtain a total area, and (iii) determining, for each of the one or more peaks, a ratio of the area under the each of the one or more peaks to the total area, the ratio representing the lift gas loss parameter corresponding to the each of the one or more peaks.

DETAILED DESCRIPTION

In one or more embodiments of the invention, the presence and depths of one or more points of entry of a lift gas from an annulus of a gas lift well into production tubing may be determined with accuracy without the need for well intervention. Based on a comparison between the depths of the one or more points of entry and the well configuration, including the positions of gas lift valves along the production tubing, it may be determined whether the points of entry correspond to operating gas lift valve(s) and/or injection gas leak(s) into the production tubing. Thus, one or more embodiments of the invention provide the capability to determine whether a gas lift well is multi-pointing (i.e. lift gas is entering through more than one gas lift valve), whether any leaks exist in the production tubing, or whether the gas lift valve is operating as expected. One or more embodiments of the invention will be described hereinafter with reference to single completion tubular flow well configurations. However, various embodiments of the invention may also be used in connection with concentric lift well configurations (tubular injection with annular production), a combination of concentric lift and tubular flow well configurations (also known as casing flow and tubing flow, respectively), and multiple installation gas lift well configurations (multiple production strings that share a common annulus).

Figure 1:
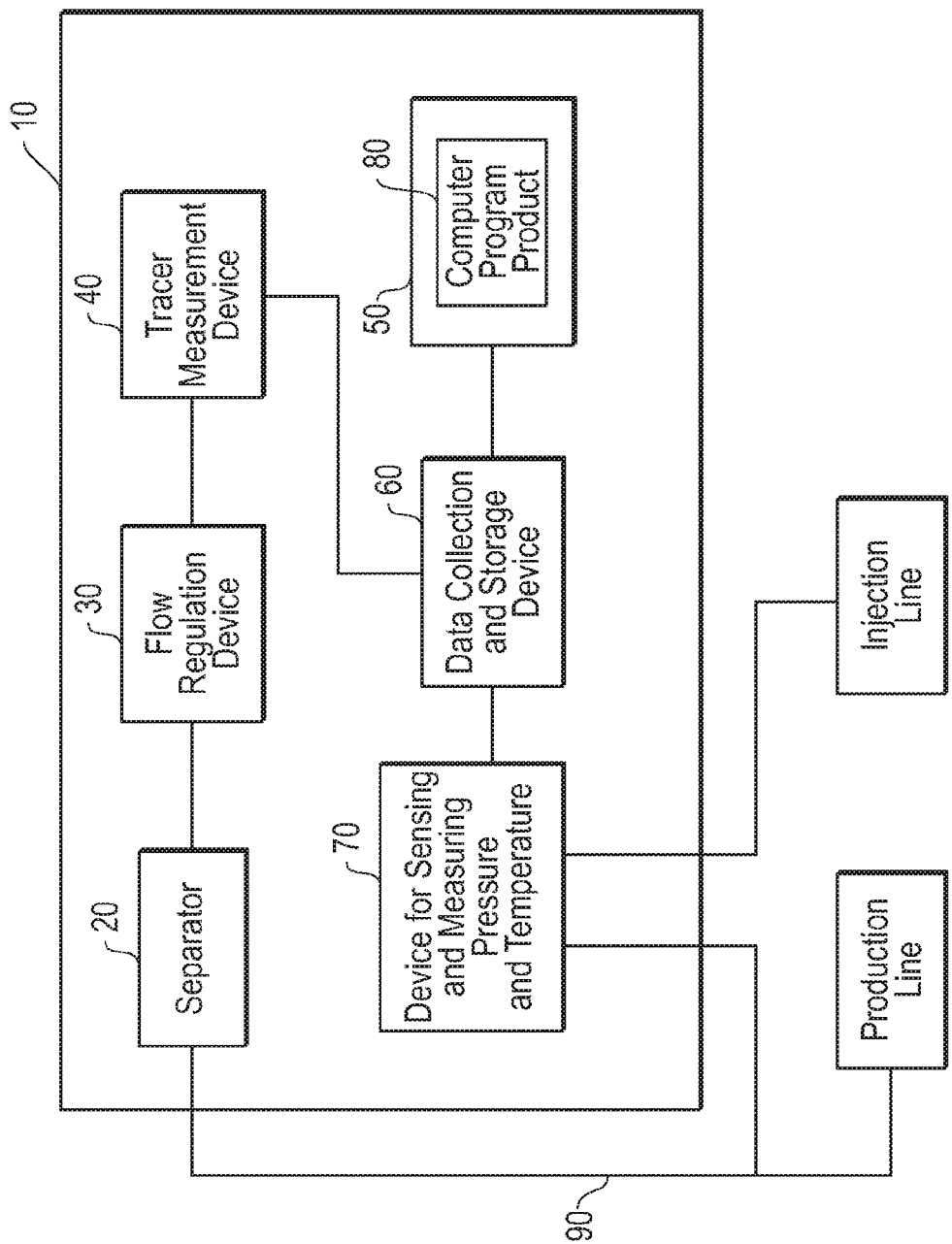
FIG. 1 is a schematic depiction of a gas lift well surveillance kit in accordance with one or more embodiments of the invention.

FIG. 1 depicts a gas lift well surveillance kit 10 in accordance with one or more embodiments of the invention. The kit 10 includes components for evaluating the performance of a gas lift well. The components include a separator 20, a flow regulation device 30, a tracer measurement device 40, a data collection and storage device 60, a device for sensing and measuring pressure and temperature 70, and a computer program product 80 embodied on a computer-readable medium.

The separator 20 is configured to separate a gaseous phase from other phases that may be present in a mixture retrieved from a production reservoir via production tubing. Fluid that is retrieved from a production reservoir may include solid particles such as pieces of the rock formation. Also, in addition to lift gas that is present in the annulus of a well and that may have entered the production tubing, other gases present in the reservoir and/or rock formation may be present in the retrieved mixture. In addition, various liquids, including a desired production liquid, may be present in the retrieved mixture.

In one or more embodiments of the invention, a sample stream 90 is removed from a production stream that may include a multi-phase mixture retrieved from the reservoir through the production tubing. The sample stream 90 is removed from the production stream through a connection to the production line. The separator 20 may act on the sample stream 90 to separate a gaseous phase from other phases present in the mixture retrieved from the reservoir. After the separator 20 separates out the gaseous phase from the sample stream 90, the gaseous phase travels through the flow regulation device 30 which controls a flow rate of the gaseous phase into the tracer measurement device 40.

The tracer measurement device 40 continuously monitors and analyzes the gaseous phase for the presence of a tracer. The gaseous phase may include a mixture of one or more gases. The tracer may be a compound supplied from a tracer supply source into the annulus of a gas lift well. The tracer travels along with a lift gas that has been injected into the annulus and enters the production tubing at points of entry of the lift gas into the production tubing.

In one or more embodiments of the invention, the tracer employed may be carbon dioxide. The tracer measurement device 40 may be a spectrometer, such as an IR spectrometer capable of measuring a concentration of the tracer present in a retrieved substance. An IR spectrometer functions by bombarding a sample with electromagnetic radiation in the infrared range of the electromagnetic spectrum and determining a transmittance and absorption spectrum for the sample. A compound will absorb infrared light having a frequency that coincides with a natural resonant vibrational frequency of a molecular bond contained within the compound. Various compounds present in the sample will absorb infrared radiation at different wavelengths, thereby permitting identification of the compounds present in the sample. Based on the absorption spectrum produced by the IR spectrometer, a concentration of compounds present in the sample can also be quantified. Thus, the IR spectrometer may be used to measure the concentration of carbon dioxide present in the gaseous phase that is separated out from the sample stream 90 removed from the production stream. Alternatively, the tracer measurement device 40 may be any device known the in art for measuring the concentration of a substance. For example, the tracer measurement device 40 may be a UV spectrometer. Alternatively, the tracer employed may be a compound that, when present within a mixture, alters the pH of the mixture in a detectable manner. If such a tracer is used, the tracer measurement device may be a pH meter. The pH meter may determine concentration of the tracer present in the mixture based on changes in the measured pH. In the alternative, the tracer measurement device 40 may be any device capable of measuring the concentration of a tracer compound present in a multi-phase mixture (in situ measurement), thereby obviating the need for the separator 20.

The computer program product 80 embodied on the computer-readable medium is configured to analyze test data acquired by the data collection and storage device 60 during a well test. The computer program product 80 is configured to provide gas lift analysis, design, prediction and optimization using one or more of the following techniques: complex injection pressure models to determine velocities in the annulus, multi-phase pressure models to determine velocities in the production tubing, and well history data for comparison over time and archiving. The data collection and storage device 60 may be a datalogger, or any other data collection and storage device known in the art. The computer program product 80 is configured to analyze the test data and provide a highly accurate assessment of the presence and depths of one or more points of entry of a lift gas from into production tubing. The computer program product 80 may be executed on a computing device 50, which may be a personal computer, at the site of testing and production. Although the computing device 50 is shown as an element of the kit 10, this is not required. That is, the computing device 50 may be provided separately from the kit 10.

Additionally, data acquired by the data collection and storage device 60 may be analyzed off-site. For example, the computing device 50 may include network communication means (not shown) for transmitting data to an off-site location. Alternatively, data collected by the data collection and storage device 60 may be transferred to another storage device (not shown) for analysis at a later time off-site. Further, the data collection and storage device 60 may be provided with a means to communicate with and transfer test data to the computing device 50 on which the computer program product 80 is being executed such that the computer program product 80 may perform analysis of the data. It is important to note that it is not necessary for the computing device 50 to be connected to the gas lift well surveillance kit 10, specifically the data collection and storage device 60, during testing and acquisition of test data. The computing device 50 may be connected to the gas lift well surveillance kit 10 after testing is complete as data acquired by the data collection and storage device 60 can be retrieved and analyzed at a later time by the computing device 50. After data acquired by the data collection and storage device 60 during a test is analyzed and interpreted, the data may be erased (i.e. the data collection and storage device 60 may be reset) in order to perform additional tests.

In one or more embodiments of the invention, the device for sensing and measuring pressure and temperature 70 may be a pressure/temperature transducer. The device for sensing and measuring pressure and temperature 70 may be utilized to sense and measure temperature and pressure within the sample stream 90 as well as within an injection line through which the tracer is injected into the annulus of the gas lift well via a connection to the injection line.

In one or more embodiments of the invention, the gas lift well surveillance kit 10 may further include at least one power source, at least one analog pressure gauge, and piping or tubing for connecting the gas lift well surveillance kit to a gas lift well. Additionally, the gas lift well surveillance kit 10 may further include a digital scale to ensure that a desired amount of tracer is injected into the well. Further, in one or more embodiments of the invention, the gas lift well surveillance kit 10 requires only one temporary connection point on the lift gas injection line and one connection point on the production line.

In one or more embodiments of the invention, the gas lift well surveillance kit 10 may further include liquid carbon dioxide cylinders or bottles, and additionally may include high pressure nitrogen bottles. Carbon dioxide contained in the carbon dioxide cylinders is injected into the annulus and serves as the tracer. However, carbon dioxide cylinders typically do not have sufficient pressure to overcome the injection pressure of the gas lift well. The high pressure nitrogen bottles may be used to over-pressurize the carbon dioxide cylinders, thereby overcoming the injection pressure of the well and allowing the carbon dioxide to be injected into the annulus.

In one or more embodiments of the invention, the gas lift well surveillance kit 10 is compact and portable. For example, in an embodiment of the invention, the gas lift well surveillance kit weighs less than 120 lbs and has physical dimensions of approximately 18"×18"×18". The gas lift well surveillance kit may be located outside of the wellhead safe zone by fifty (50) or one-hundred (100) foot stainless steel hoses.

In one or more embodiments of the invention, the gas lift well surveillance kit 10 obviates the need for stopping production of the well during troubleshooting. Further, the gas lift well surveillance kit 10 according to one or more embodiments of the invention is safe to operate because no tools are introduced into the well bore. Moreover, because the determination of points of entry of the lift gas into the production tubing is related to surface casing pressure and lift-gas rate measurements, the kit 10 is suitable for situations in which pressure surveys are not feasible.

Figure 2A:
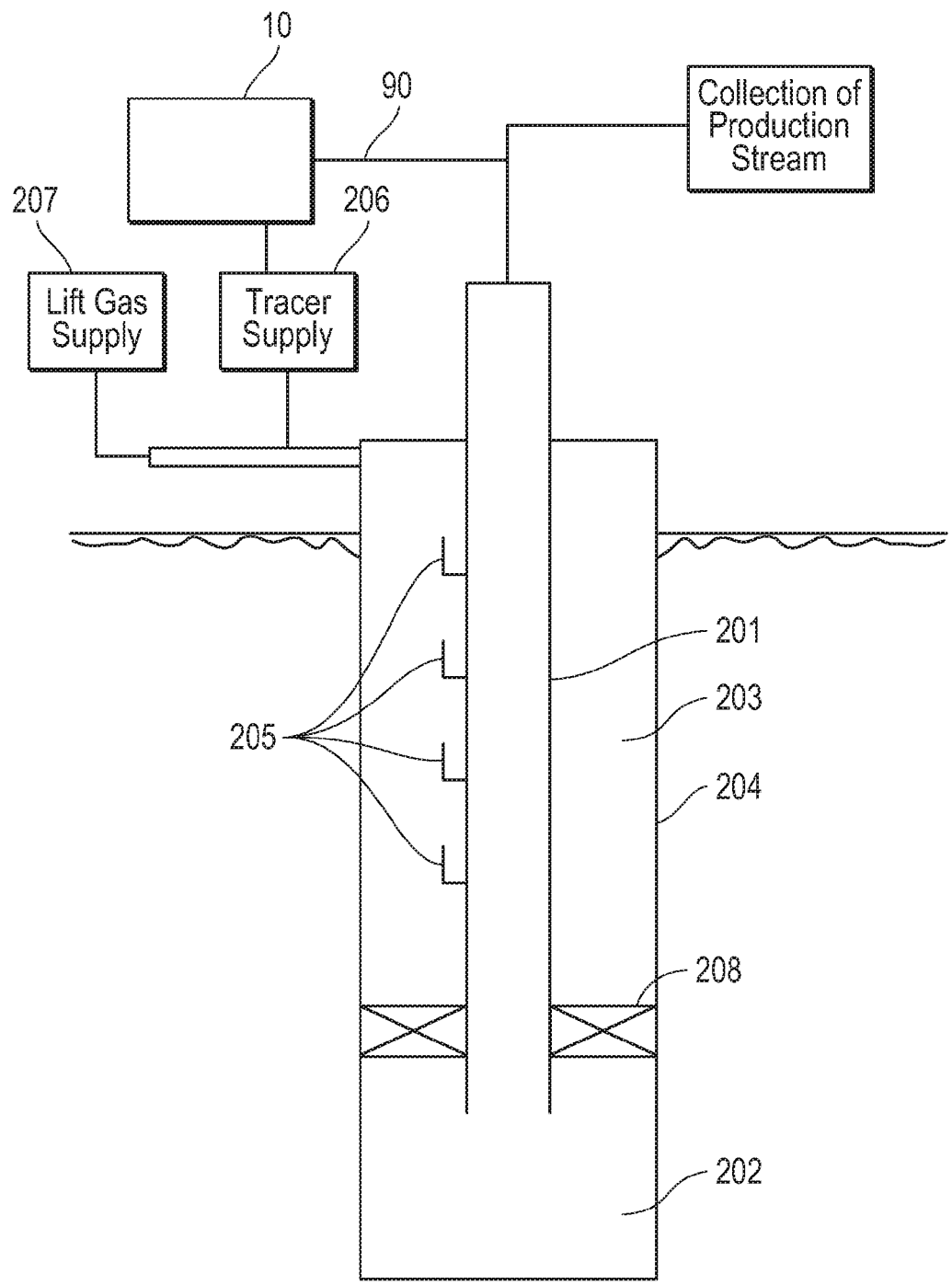
FIG. 2A is a schematic depiction of a gas lift well surveillance kit in accordance with one or more embodiments of the invention shown connected to a single completion gas lift well.

FIG. 2A is a schematic depiction of the gas lift surveillance kit 10 of FIG. 1 connected to a single completion gas lift well. The single completion gas lift well includes production tubing 201 that extends from at or above a ground surface to a depth within a reservoir 202. The reservoir 202 contains one or more fluids that are to be retrieved through the production tubing 201. The gas lift well depicted in FIG. 2A is a tubular flow well configuration in which lift gas is supplied from a lift gas supply source 207 into an annulus 203 formed between a well casing 204 and the production tubing 201, and one or more fluids are retrieved from the reservoir 202 via the production tubing 201. However, as previously noted, the gas lift well surveillance kit 10 in accordance with one or more embodiments of the invention may be used in connection with other types of gas lift wells including concentric flow (casing flow) wells and multiple installation gas lift wells (wells that have two or more production tubings that share a common annulus).

Still referring to FIG. 2A, lift gas is supplied to the annulus 203 by the lift gas supply 207. Lift gas occupies the annulus 203 and may enter the production tubing 201 through gas lift valves 205 disposed along the production tubing 201 and/or through leaks present in the production tubing 201. The lift gas aids in bringing one or more substances from the reservoir 202 to the surface. Further, a tracer is supplied into the annulus 203 by a tracer supply source 206. The tracer may be carbon dioxide. Alternately, the tracer may be any compound or combination of compounds that is capable of detection and whose concentration is capable of being measured in a substance retrieved from the gas lift well. The tracer may enter the production tubing 201 through one or more of the gas lift valves 205 and/or through leaks in the production tubing 201.

Containers of high pressure nitrogen gas may be used to increase the pressure of the carbon dioxide supplied by the tracer supply source 206, if necessary to overcome an injection pressure of the gas lift well. A packer 208 is optionally formed within the well casing 204 to isolate the production tubing 201 from the annulus 203.

Still referring to FIG. 2A, gas lift mandrels having gas lift valves 205 operatively connected thereto are disposed along the production tubing 201. Variation in tubing and casing pressures causes the gas lift valves 205 to open and close, thereby allowing the lift gas to be injected into the production tubing 201.

The gas lift well surveillance kit 10 may be connected to the production tubing 201 in order to obtain the sample stream 90 from the production stream for testing and analysis. More specifically, the gas lift well surveillance kit 10 may be connected via tubing to a wellhead tree disposed on a top portion of the production tubing 201 in order to provide a continuous sample stream 90 of the production stream to the kit 10 for analysis. Further, the connection of the kit 10 to the tracer supply source 206 allows the device for sensing and measuring pressure and temperature to monitor the pressure and temperature within the injection line through which tracer is supplied from the tracer supply source 206.

Figure 2B:
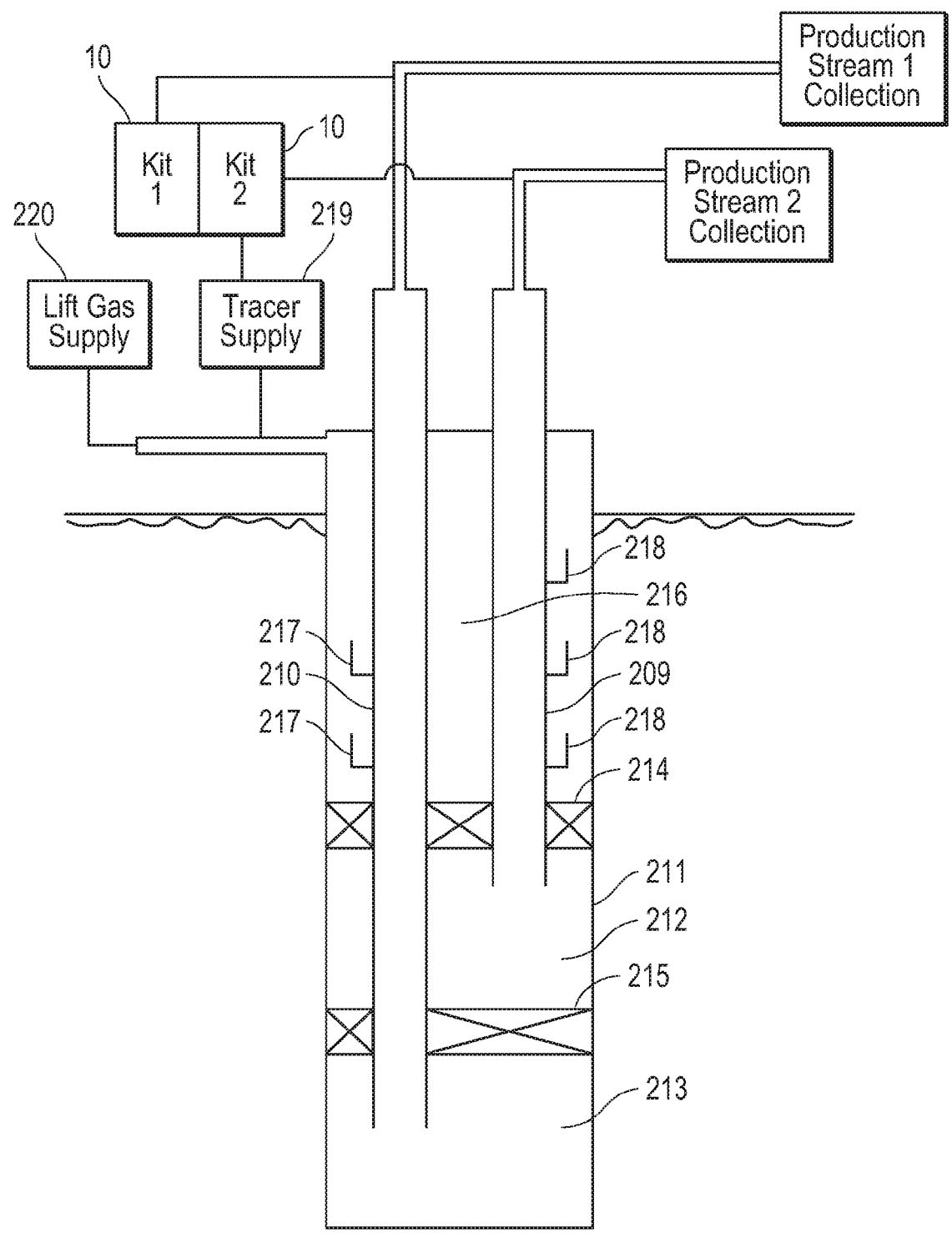
FIG. 2B is a schematic depiction of a gas lift well surveillance kit in accordance with one or more embodiments of the invention shown connected to a dual completion gas lift well.

FIG. 2B is a schematic depiction of the gas lift well surveillance kit 10 in accordance with one or more embodiments of the invention connected to a dual completion gas lift well. Although the description that follows will be presented with reference to a dual completion gas lift well, the invention is not limited to such a well, and a gas lift well surveillance kit in accordance with one or more embodiments of the invention may be used in connection with a multiple installation well of any configuration known in the art.

The dual completion gas lift well includes two production tubings 209, 210 disposed within a well casing 211. One production tubing 209 (hereinafter "short string") extends from at or above a ground surface to a depth within a first reservoir 212. The other production tubing 210 (hereinafter "long string") extends from at or above a ground surface to a depth within a second reservoir 213. Two packers 214, 215 are used to isolate the two reservoirs 212, 213. A dual packer 214 is provided that includes two bores through which the short string 209 and the long string 210 extend. A single packer 215 is provided that includes a single bore through which the long string 210 extends. Together, the two packers 214, 215 serve to isolate one production reservoir from the other, and thus serve to isolate the short string 209 from the long string 210. As a result, the short string 209 and the long string 210 are substantially incapable of fluid communication with each other. Such a design maintains the integrity of the two production streams generated from reservoirs 212, 213.

Gas lift mandrels having gas lift valves 217 operatively connected thereto are disposed at positions along the long string 210. Similarly, gas lift mandrels having gas lift valves 218 operatively connected thereto are disposed at positions along the short string 209. The short string 209 and the long string 210 share a common annulus 216. That is, the short string 209 and the long string 210 are each capable of potential fluid communication with the annulus (through their respective gas lift valves 218, 217).

Similarly to FIG. 2A, lift gas is supplied to the annulus 216 by the lift gas supply source 220. Lift gas occupies the annulus 216 and may enter the short string 209 and/or the long string 210 through one or more of their respective gas lift valves 218, 217 and/or through leaks present in either string. The lift gas aids in bringing one or more substances from reservoirs 212, 213 to the surface. Further, a tracer is supplied into the annulus 216 by a tracer supply source 219. The tracer may be carbon dioxide. Alternately, the tracer may be any compound or combination of compounds that is capable of detection and whose concentration is capable of being measured in a substance retrieved from the gas lift well. The tracer may enter (along with the lift gas) the short string 209 and/or the long string 210 through one or more of their respective gas lift valves 218, 217 and/or through leaks in either string.

Two gas lift well surveillance kits 10 in accordance with one or more embodiments of the invention are shown connected to components of the dual completion well in FIG. 2B. It is not necessary that the two kits include the same number and type of components. A sample stream is generated from production stream 1 (which includes one or more fluids produced from reservoir 213). The sample stream is fed to Kit 1 which analyzes the sample stream in the manner described earlier, and which will be described in further detail hereinafter. Similarly, a sample stream is generated from production stream 2 (which includes one or more fluids produced from reservoir 212). This sample stream is fed to Kit 2 which then analyzes the sample stream in the manner described earlier, and which will be described in further detail hereinafter.

One or more embodiments of the invention include computer-implemented methods described in greater detail below. In various embodiments, methods of the invention may be carried out entirely on one apparatus or computing device. Alternatively, portions of the methods may be carried out on two or more computers connected by a network or a network device connecting the computers. The order of method elements as described herein does not necessarily limit the order in which the elements can be performed.

One or more embodiments of the invention may be implemented partially, or in whole, as software modules installed and running on one or more data processing systems ('computers'), such as servers, workstations, tablet computers, PCs, personal digital assistants ('PDAs'), smart phones, and so on. The computer includes at least one computer processor as well as a computer memory, including both volatile random access memory ('RAM') and some form or forms of non-volatile computer memory such as a hard disk drive, an optical disk drive, or an electrically erasable programmable read-only memory space (also known as 'EEPROM' or 'Flash' memory). The computer memory is connected through a system bus to the processor and to other system components. Thus, the software modules are program instructions stored in computer memory.

An operating system is stored in the computer memory. The operating system may be any appropriate operating system such as Windows 98, Windows NT 4.0, Windows 2000, Windows XP, Windows Vista, Mac OS X, UNIX, LINUX, or AIX from International Business Machines Corporation. A network stack may also be stored in memory. The network stack is a software implementation of cooperating computer networking protocols to facilitate network communications.

The computer may also include one or more input/output interface adapters. Input/output interface adapters may implement user-oriented input/output through software drivers and computer hardware for controlling output to output devices such as computer display screens, as well as user input from input devices, such as keyboards and mice.

Figure 3:
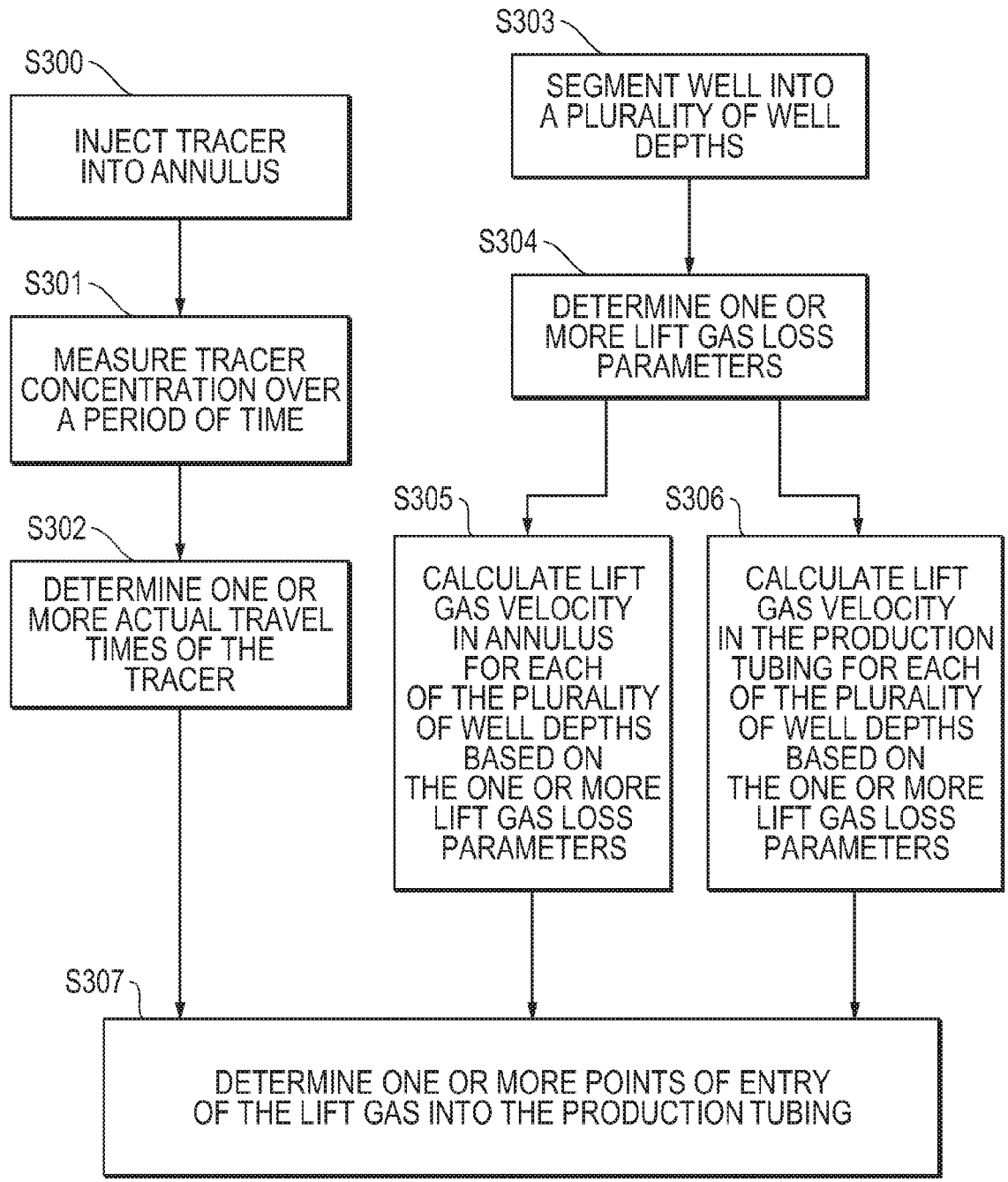
FIG. 3 depicts a flowchart illustrating a method for evaluating the performance of a gas lift well in accordance with one or more embodiments of the invention.

FIG. 3 depicts a flow chart illustrating a method for evaluating the performance of a gas lift well in accordance with one or more embodiments of the invention. In step S300 of the method illustrated in FIG. 3, an amount of tracer is injected into the annulus of a gas lift well through an injection line. As described earlier, the tracer may be carbon dioxide. The tracer may be supplied from a tracer supply source that includes one or more containers of carbon dioxide accompanied by one or more containers of nitrogen to over-pressurize the carbon dioxide in order to overcome an injection pressure of the gas lift well.

The tracer may be supplied to the annulus of a well in liquid phase. For example, the tracer supply source may include containers of liquid carbon dioxide that are pressurized to at least a minimum pressure required to maintain the carbon dioxide in a liquid phase. The liquefied carbon dioxide rapidly converts to a gaseous phase upon injection into the annulus. Due to the high compressibility of carbon dioxide, a relatively small volume of liquefied carbon dioxide converts to a relatively large volume of gaseous carbon dioxide upon injection into the annulus. Therefore, injecting liquid phase carbon dioxide is advantageous because a relatively small amount of injected carbon dioxide produces a relatively large volume of gaseous carbon dioxide which improves the accuracy of measurement results obtained by the tracer measurement device.

Further, as previously described, a gas well surveillance kit according to one or more embodiments of the invention that is used to perform the method illustrated in FIG. 3 may include a digital scale to precisely control the amount of tracer introduced into the annulus. In addition, a gas lift well surveillance kit in accordance with one or more embodiments of the invention includes a device for sensing and measuring pressure and temperature within the injection line through which the tracer is injected in the annulus. The amount of tracer injected into the annulus and the rate of tracer injection may be controlled based on measurements obtained by the device for sensing and measuring pressure and temperature.

Upon injecting the tracer into the annulus of the gas lift well, in step S301, the concentration of the tracer is measured in a sample stream obtained from a production stream of the gas lift well. As described earlier, a gas lift well surveillance kit in accordance with one or more embodiments of the invention includes a separator that is configured to separate out a gaseous phase from a multi-phase sample stream. The gaseous phase is monitored for the presence of the tracer. Tracer that is injected into the annulus of the gas lift well will enter the production tubing at any point that the lift gas contained within the annulus enters the production tubing (e.g. through gas lift valves positioned along the production tubing and/or leaks in the production tubing).

A gas lift well surveillance kit in accordance with one or more embodiments of the invention includes a tracer measurement device that measures, over a period of time, the concentration of the tracer present in, for example, a gaseous phase that has been separated from a sample stream obtained from a production stream. The duration of the tracer measurement depends on the physical characteristics of the well being surveyed and can range from 60 minutes to 12 or more hours. Typical tracer return times are between 1 hour and 7 hours.

In step S301, the tracer measurement device may measure an initial baseline concentration of tracer present in the gaseous phase separated from the sample stream. The baseline tracer concentration may refer to the concentration of a certain initial amount of tracer that is present in the production stream prior to any of the injected tracer entering the production tubing For example, the tracer measurement device may detect small, random fluctuations in the concentration of the tracer measured in produced reservoir fluid. These fluctuations may be indicative of a baseline tracer concentration present in the produced fluid or measurement error.

The baseline tracer concentration may oscillate periodically. For example, the baseline tracer concentration may oscillate sinusoidally, or with any other periodicity. Periodic oscillation of the baseline tracer concentration may be due to a repeating variation in casing and/or tubing pressures that causes one or more gas lift valves to open and close in a periodic manner. Alternately, the baseline tracer concentration may vary in a non-periodic manner, or may remain substantially constant.

In step S302 of the method of the invention illustrated in FIG. 3, one or more actual travel times of the tracer are determined. An actual travel time of the tracer corresponds to a deviation in the measured concentration of the tracer over the period of time from a pattern present in the baseline concentration of the tracer. The term "pattern" as used herein with reference to the baseline tracer concentration refers to any concentration of tracer that is not indicative of an actual travel time of tracer. An actual travel time of the tracer refers to a duration corresponding to the time required for injected tracer to travel from the injection point, down the annulus, through an operating valve or leak in the production tubing, and return to a measurement point. The term "pattern" should not be construed to require any periodicity or regularity in the baseline tracer concentration. The term "pattern" merely refers to any characteristic of the baseline tracer concentration that identifies the baseline tracer concentration as such and distinguishes it from a tracer concentration that indicates an actual travel time of the tracer.

In step S303, the gas lift well that is being tested is segmented into a plurality of ranges of well depth. The depth of the well may be determined using any starting point and extending to any desired depth within the well. Determination of the well depth may vary based on the particular characteristics of the well being surveyed. In an exemplary embodiment, well depth may be calculated from an injection point of the tracer to a depth within the well. The ranges of well depth into which the well is segmented may vary in size and may or may not overlap. Alternatively, some of the ranges of well depth may overlap while other ranges do not. In an embodiment of the invention, the well depth is segmented into a plurality of ranges of well depth that are substantially equal in size and do not overlap. For example, assuming a well depth of 4000 ft. the well may be segmented into 100 ranges of well depth, each range corresponding to 40 ft of well depth. It should be noted that the ranges of well depth will not be of equal size in an embodiment of the invention in which lift gas velocities are determined using integration. It should be noted that the segmentation of the well into a plurality of well depths (step S303) may occur prior to, concurrently with, or subsequent to any of steps S300-S302.

In step S304 of the method of the invention illustrated in FIG. 3, one or more lift gas loss parameters are determined. Each lift gas loss parameter is determined based on the tracer concentration measured by the tracer measurement device. Each lift gas loss parameter corresponds to a particular point of entry of the lift gas into the production tubing and provides a measure of an effect of entry of a portion of the tracer into the corresponding point of entry on the actual travel time of the tracer that enters the production tubing at each point of entry that is located at a depth greater than the corresponding point of entry. As noted above, a deviation in a pattern present in the baseline concentration of tracer indicates an actual travel time of tracer which, in turn, corresponds to a point of entry of tracer (and lift gas) into the production tubing.

When lift gas enters at a particular point of entry into the production tubing, the velocity of the lift gas in the annulus (and by extension the velocity of the tracer in the annulus) is reduced for any well depths below that point of entry. The extent to which the velocity is reduced is proportionate to the amount of lift gas that entered into the production tubing at that point of entry. In a similar manner, the velocity of the lift gas in the production tubing above the point of entry of the lift gas into the production tubing is increased proportionately to the amount of lift gas that entered the production tubing at that point of entry. As such, the lift gas loss parameter that corresponds to a particular point of entry provides a measure of the effect of entry of lift gas into the production tubing at that point of entry on the velocity of lift gas in the annulus at depths greater than the point of entry and the velocity of lift gas in the production tubing at shallower depths than the point of entry. The determination of the lift gas loss parameters will be described in greater detail later through reference to FIG. 5.

After a lift gas loss parameter has been determined for each point of entry of the lift gas into the production tubing, a velocity of the lift gas in the annulus is calculated, in step S305, for each of the plurality of ranges of well depth determined by the segmentation in step S303. The velocities of the lift gas in the annulus are calculated for the plurality of ranges of well depth based on the one or more lift gas loss parameters determined in step S304. Similarly, in step S306, a velocity of the lift gas in the production tubing is calculated for each of the plurality of ranges of well depth based on the one or more lift gas loss parameters determined in step S304. Steps S305 and S306 may be performed concurrently or with partial overlap. It should be noted that the size and number of ranges of well depth into which the well is segmented may not be the same for the annulus and the production tubing. Thus, as a velocity of the lift gas is calculated for each range of well depth, the number of discrete velocities calculated in the production tubing may differ from the number of discrete velocities calculated in the annulus.

In addition to the one or more lift gas loss parameters, one or more other parameters may be used to calculate the lift gas velocities in the annulus and/or in the production tubing. For example, in addition to the one or more lift gas loss parameters, one or more of the following parameters may be used to determine the lift gas velocity in the annulus for each of the plurality of ranges of well depth: (i) a plurality of pressures in the annulus, each of the plurality of pressures corresponding to one of the plurality of ranges of well depth, (ii) a flow rate of the lift gas in the annulus, (iii) an injection pressure of the lift gas, (iv) a volume of the annulus per a unit of well depth, (v) a temperature in the annulus, (vii) a parameter that represents a frictional force opposing flow in the annulus, and (viii) a parameter that represents an effect of gravity on flow in the annulus. In calculating the velocity of the lift gas in the annulus for a particular range of well depth from among the plurality of ranges of well depth, one or more parameters listed above may be measured or determined specifically for that range of well depth. For example, if the velocity of the lift gas in the annulus were being determined for a range of well depth from 400-450 ft, a temperature in the annulus at this range of well depth, a pressure in the annulus at this range of well depth, a flow rate of the lift gas in the annulus across this range of well depth, and so on may be used. In this manner, a highly accurate calculation of the velocity of the lift gas in the annulus that is specific to each range of well depth is obtainable.

Similar to the calculation of velocities of the lift gas in the annulus, in addition to the one or more lift gas loss parameters, one or more of the following parameters may be used to calculate the velocity of the lift gas in the production tubing for each of the plurality of ranges of well depth: (i) a plurality of pressures in the production tubing, each of the plurality of pressures corresponding to one of the plurality of ranges of well depth, (ii) a flow rate of the lift gas in the production tubing, (iii) a temperature in the production tubing, (iv) a parameter that represents a frictional force opposing flow in the production tubing, (v) a parameter that represents an effect of gravity on flow in the production tubing, (vi) a ratio of a gaseous phase to a non-gaseous phase in the substance retrieved from the gas lift well, (vii) a flow rate of one or more gases present in the substance retrieved from the gas lift well, (viii) a flow rate of one of more liquids present in the substance retrieved from the gas lift well, (ix) a well head pressure, and (x) a separator pressure. In calculating the velocity of the lift gas in the production tubing for a particular range of well depth from among the plurality of ranges of well depth, one or more parameters listed above may be measured or determined specifically for that range of well depth. For example, if the velocity of the lift gas in the production were being determined for a range of well depth from 400-450 ft. a temperature in the production tubing at this range of well depth, a pressure in the production tubing at this range of well depth, a flow rate of the lift gas in the production tubing across this range of well depth, and so on may be used. In this manner, an accurate calculation of the velocity of the lift gas in the production tubing that is specific to each range of well depth is obtainable.

It should be noted that in addition to, or as an alternative to, the parameters listed above, other parameters may be used to determine the velocity of the lift gas in the annulus and/or the velocity of the lift gas in the production tubing for each of the plurality of ranges of well depth.

In one or more additional embodiments of the invention, the velocity of the lift gas in the annulus and/or the velocity of the lift gas in the production tubing may be calculated in a progressive or iterative manner. More specifically, for example, a velocity of the lift gas in the annulus that is calculated for a first range of well depth may be used as a parameter, potentially along with one or more other parameters, to determine a velocity of the lift gas in the annulus for a second range of well depth that immediately follows the first range of well depth. This manner of determining velocities may then proceed in an iterative fashion until the velocity for any given range of well depth in the annulus is determined based on a velocity calculated for a range of well depth that immediately precedes the given range of well depth.

Figure 4:
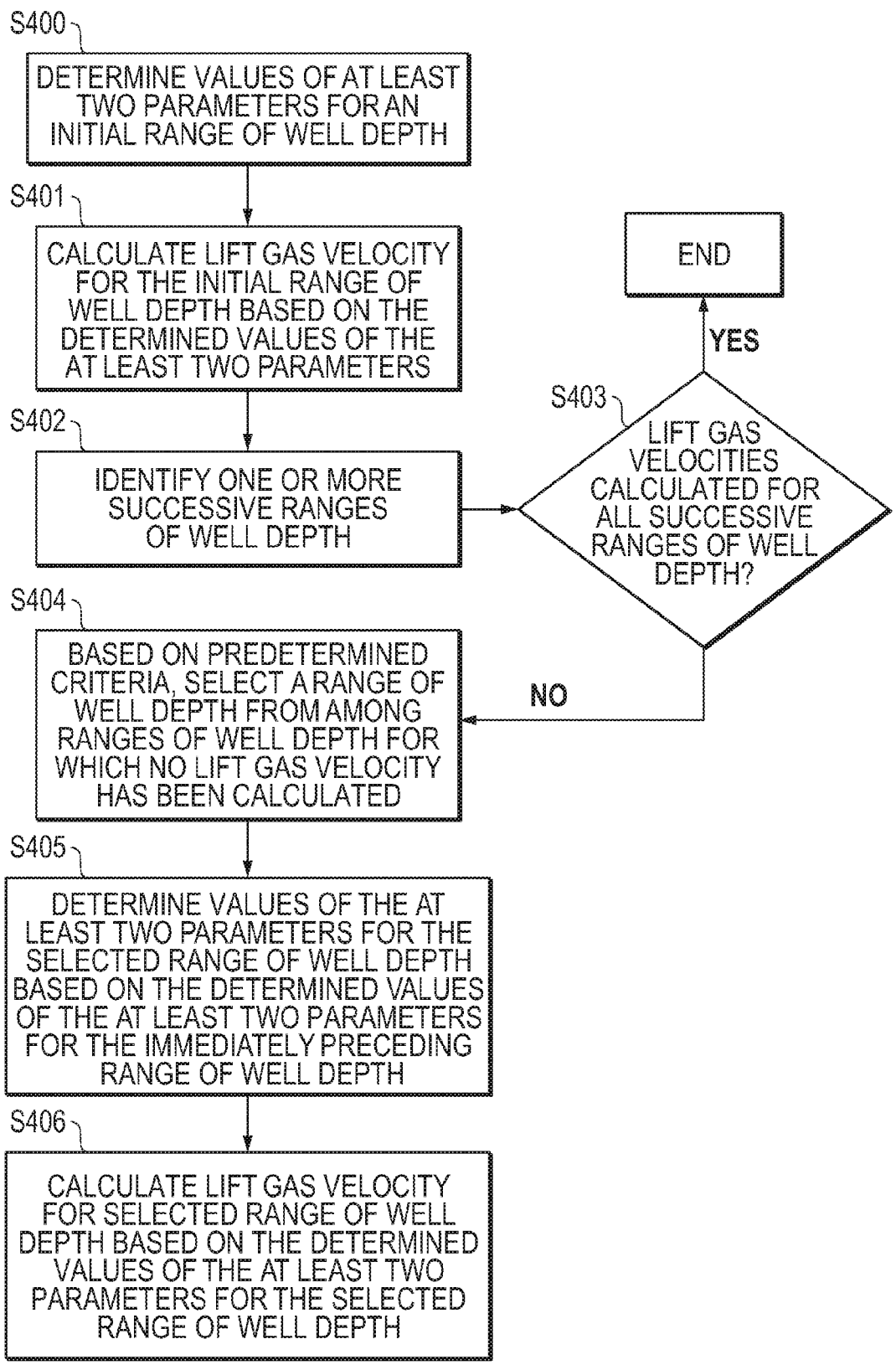
FIG. 4 depicts a flowchart illustrating a method in accordance with one or more embodiments of the invention.

The iterative calculation of velocities will be described in greater detail through reference to FIG. 4. FIG. 4 illustrates an iterative determination of velocities in the annulus and/or the production tubing in accordance with an embodiment of the invention. For simplicity, however, the method illustrated in FIG. 4 will be described with reference to calculating lift gas velocities in the annulus. In initial step S400, values of at least two parameters are determined for an initial range of well depth of the plurality of ranges of well depth. For example, the at least two parameters may include a pressure and a temperature in the annulus corresponding to the initial range of well depth. Values for one or more of the annulus parameters described earlier may also be determined. Subsequently, in step S401, a velocity of the lift gas in the annulus is calculated for the initial range of well depth based on the determined values of the at least two parameters. For example, the lift gas velocity for the initial range of well depth may be calculated based on the pressure and temperature corresponding to the initial range. If the values of one or more additional parameters are determined, these values may additionally be used to determine the lift gas velocity in the annulus for the initial range of well depth. The initial range of well depth may be the range of well depth having the shallowest maximum well depth from among the plurality of ranges of well depth. The "well depth" of a particular point within a well, as used herein, refers to a distance from that point within the well to a measurement starting point. For example, the well depth of a particular point within a well may correspond to a distance from an injection point of the tracer to that point within the well. Alternatively, the measurement starting point for determining well depth may any point within the well or any point at or above the surface of the well.

Then, in step S402, one or more successive ranges of well depth are identified. As used herein with respect to FIG. 4, successive ranges of well depth refer to ranges of well depth other than the initial range of well depth. The successive ranges of well depth may, for example, include all ranges of well depth other than the initial range of well depth, or may optionally include only some of the plurality of ranges of well depth other than the initial range. Subsequently, in step S403, a determination is made as to whether a velocity of the lift gas has been calculated for each of the identified successive ranges of well depth. If the determination in step S403 is NO, a lift gas velocity has been determined for each range of well depth, and the method ends. If the determination in step S403 is YES, then, based on predetermined criteria, a range of well depth is selected from among the ranges of well depth for which no lift gas velocity has been calculated (S404). The predetermined criteria that determine which range of well depth from among the successive ranges of well depth will be selected may be any criteria that allow a range of well depth to be unambiguously selected. For example, the predetermined criteria may require selection of the range of well depth having a smallest maximum well depth, where well depth in this scenario is measured from a point at or above a surface of the well. Alternately, the predetermined criteria may require selection of the range of well depth having the largest maximum well depth from among the identified ranges of well depth.

Thereafter, in step S405, values of the at least two parameters are determined for the selected range of well depth based on the determined values of the at least two parameters for the range of well depth that immediately precedes the selected range. For example, pressure and temperature may be determined for the selected range based on the pressure and temperature determined for the immediately preceding range. Subsequently, in step S406, the lift gas velocity is calculated for the selected range of well depth based on the determined values of the at least two parameters for the selected range of well depth. For example, the lift gas velocity may be calculated for the selected range based on the determined pressure and temperature corresponding to the selected range.

After the lift gas velocity has been calculated for the selected range of well depth, a determination is again made as to whether a lift gas velocity has been calculated for all successive ranges of well depth that have been identified (S403). If the determination in step S403 is YES, the iterative calculation of lift gas velocities is complete. If the determination is NO, a range of well depth is again selected from among the ranges of well depth for which no lift gas velocity has been calculated based on the predetermined criteria.

Referring back to FIG. 3, after a velocity of the lift gas in the annulus and a velocity of the lift gas in the production tubing have been calculated for each of the plurality of ranges of well depth, in step S307, one or more points of entry of the lift gas into the production tubing are determined. More specifically, the one or more points of entry of the lift gas into the production tubing are determined based on the one or more actual travel times of the tracer determined in step S302 and the velocity of the lift gas in the annulus and the velocity of the lift gas in the production tubing calculated for each of the plurality of ranges of well depth.

The one or more points of entry of the lift gas into the production tubing correspond to well depths at which lift gas is entering the production tubing. In accordance with one or more embodiments of the invention, the method illustrated in FIG. 3 may further include a step in which the one or more determined points of entry of the lift gas into the production tubing are compared to the one or more points of communication (used herein to refer to gas lift valves or the positions of gas lift valves along the production tubing). Such a comparison permits a determination to be made as to whether a particular determined point of entry of the lift gas corresponds to a leak of the lift gas into the production tubing or entry of the lift gas into the production tubing through a gas lift valve.

Figure 5:
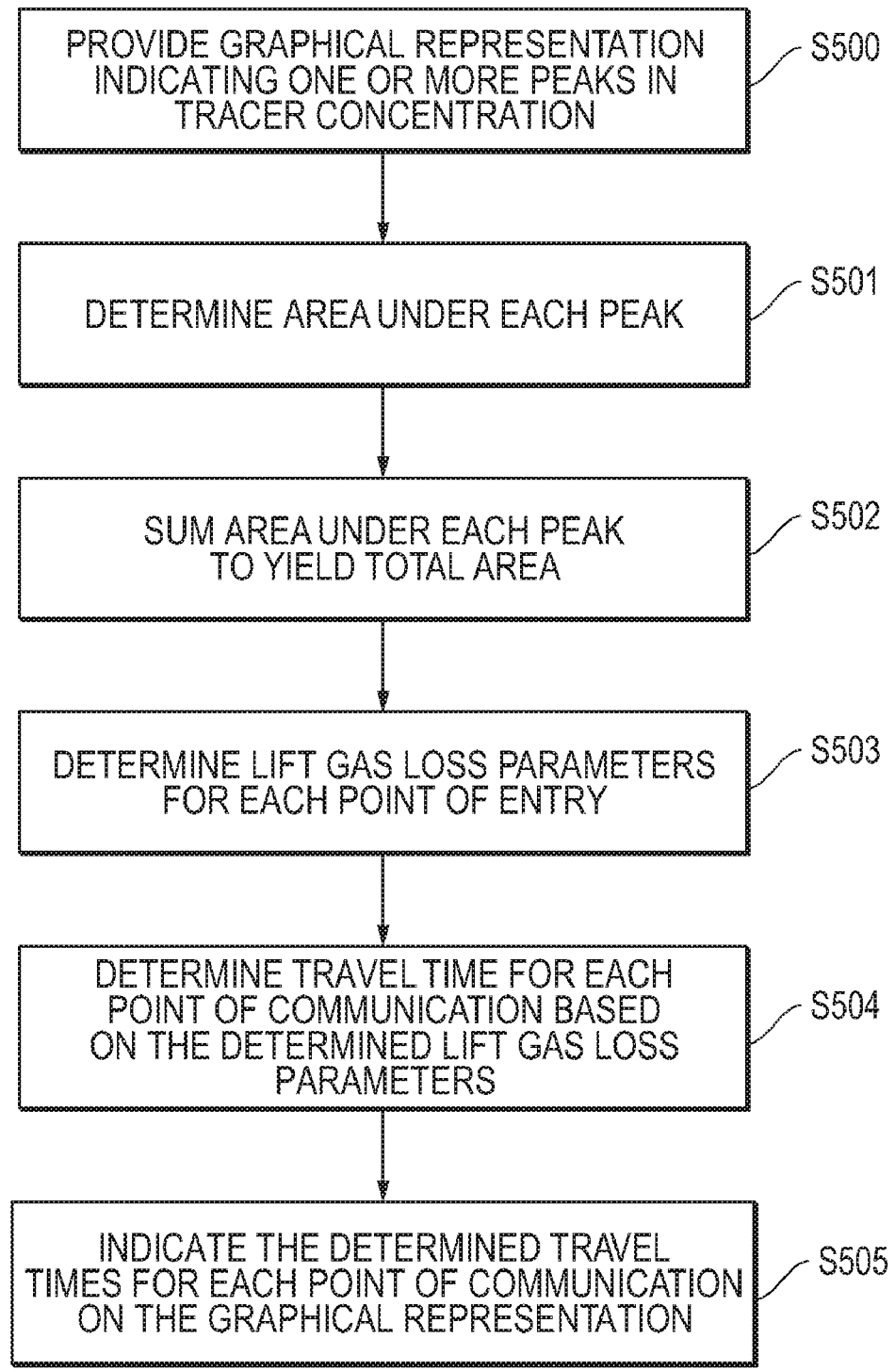
FIG. 5 depicts a flowchart illustrating a method in accordance with one or more embodiments of the invention.

The determination of one or more lift gas loss parameters in accordance with one or more embodiments of the invention will be described in greater detail through reference to FIG. 5. In an initial step S500, a graphical representation of the tracer concentration measured over a period of time is provided. The graphical representation may be a Cartesian plot of tracer concentration as a function of time. The units of measurement are not limited and may be any suitable units for measuring concentration and time. In one or more embodiments of the invention, the graphical representation may be generated by the computer program product (FIG. 1, element 80) of the gas lift well surveillance kit 10 and displayed through a user interface provided on, for example, the computing device 50. Alternately, the graphical representation may be transferred to a remote computing device through network communications means provided in the computing device 50 and displayed to a user on the remote computing device. As described earlier, the graphical representation may indicate a baseline tracer concentration. Further, the graphical representation may indicate one or more actual travel times of the tracer through one or more peaks in the tracer concentration. As discussed earlier, an actual travel time of the tracer is any deviation from a pattern present in the baseline tracer concentration. The term "pattern" does not require any regularity or periodicity in the baseline tracer concentration, but merely refers to a characteristic of the tracer concentration that identifies it as a baseline tracer concentration. The graphical representation will include a peak in tracer concentration for each actual travel time of the tracer.

After the graphical representation that includes one or more peaks is provided, in step S501, an area under each peak is determined. The area may be determined using integral calculus or another mathematical technique. Subsequently, in step S502, each determined area is summed to yield a total area. That is, the area under each peak is summed together to arrive at a total area under all peaks in tracer concentration.

Thereafter, in step S503, a lift gas loss parameter is determined for each point of entry. Each peak in the graphical representation corresponds to an actual travel time of the tracer. Each peak in tracer concentration also corresponds to an actual point of entry of the tracer, and thus the lift gas, from the annulus into the production tubing. An actual travel time of the tracer corresponds to duration from a time of injection of the tracer into the annulus until the tracer returns to a measurement point. Thus, each point of entry of the tracer will have an actual travel time associated with it. Further, each point of entry will have a corresponding peak on the graphical representation at the actual travel time of the tracer associated with that point of entry.

In step S503, a lift gas parameter is calculated for each point of entry by calculating a ratio of the area under the peak that corresponds to that point of entry with the total area under all the peaks. The lift gas parameter that corresponds to a particular point of entry may thus be correlated to the amount of tracer lost from the annulus into the production tubing at that point of entry. For example, if the area under a particular peak represents 25% of the total area under all peaks, it can be concluded that 25% of the total tracer injected into the annulus entered the production tubing at that point of entry (either through a leak in the production tubing or through a point of communication (i.e. valve).

After a lift gas loss parameter has been determined for each peak (point of entry), in step S504, a travel time of the tracer corresponding to each point of communication is determined based on the one or more determined lift gas parameters. As noted earlier, a point of communication generally corresponds to a valve, but more generally may correspond to any predetermined potential point of entry of lift gas into the production, in contrast to, for example, a leak into the production tubing which is not anticipated as a predetermined potential point of entry of lift gas. A tracer travel time for a particular point of communication corresponds to duration between a time of injection of the tracer into the annulus and time of return of the tracer to a point of measurement, assuming the tracer traveled down the annulus and entered the production tubing at the particular point of entry. The lift gas velocities in the annulus and in the production tubing which are determined for each of the plurality of ranges of well depth are used to determine the tracer travel times for each of the points of communication.

As an example, assume a graphical representation indicates two peaks in tracer concentration, and the lift gas parameter for peak 1 is 35% and the lift gas loss parameter for peak 2 is 65%. In determining the travel time of the tracer for a point of communication, all peaks corresponding to points of entry having well depths shallower than the point of communication are first identified. A well depth corresponding to a point of entry may be calculated based on the actual tracer travel time associated with the point of entry and the velocities of the lift gas in the annulus and in the production tubing that are calculated based on the one or more lift gas loss parameters. After the depth of each point of entry is determined, the relative depth of a point of communication may be ascertained, and as such, a determination as to which lift gas parameters will be used in determining the travel time for the point of communication may be made.

In the present example, assume that only peak 1 corresponds to a point of entry having a well depth shallower than the point of communication for which a travel time is being determined. In determining the travel time for the point of communication, a velocity of the lift gas in the annulus would not be affected by the peak 1 point of entry at a well depth that is shallower than the well depth of the peak 1 point of entry. A velocity of the lift gas in the annulus would be lowered by 35% (the lift gas loss parameter) for the range of well depth between the peak 1 point of entry and the point of communication. Similarly, a velocity of the lift gas in the production tubing for the range of well depth between the point of communication and the peak 1 point of entry would be unaffected by the peak 1 lift gas loss parameter. Further, for the range of well depth from the peak 1 point of entry to a measurement point, the velocity of the lift gas in the production tubing would be increased based on the lift gas parameter for peak 1 in order to compensate for the additional amount of lift gas entering the production tubing at the point of entry corresponding to peak 1.

In this manner, the travel time associated with a particular point of communication may be determined. After the travel times associated with the points of communication have been determined, they may be indicated on the graphical representation (S505). For example, in a sample graphical representation, the travel times associated with the points of communication may be indicated by vertical lines overlaying the continuous plot of tracer concentration as a function of time.

In this manner, an operator or user of a gas lift well surveillance kit in accordance with one or more embodiments of the invention may quickly and efficiently determine whether a point of entry of the tracer/lift gas into production tubing corresponds to an operating valve or a leak, and if the point of entry corresponds to an operating valve, the user may further determine which valve(s) is operating. Thus, the gas lift well surveillance kit in accordance with one or more embodiments of the invention provides an efficient graphical means for comparing the actual travel times of the tracer (which correspond to points of entry) with the travel times determined for the points of communication (which correspond to valve positions) in order to determine whether a point of entry corresponds to entry of the lift gas into the production tubing through a particular point of communication (valve) or as a result of a leak. It should be noted that the well depths associated with each point of entry are determined using the velocities of the lift gas in the annulus and in the production tubing calculated for each of the plurality of ranges of well depth based on the one or more lift gas parameters, and the calculated well depths may be compared in a non-graphical manner to known well depths for each point of communication in order to determine whether each point of entry corresponds to entry of the lift gas through a valve or a leak in the production tubing.

It should be noted that any of the previously discussed embodiments of the invention, although discussed with reference to single completion tubular flow gas lift well configuration, may be used in connection with any type of gas lift well configuration known in the art including any multiple completion gas lift well (well that includes two or more production tubings). In the case of multiple completion gas lift wells, a velocity of the lift gas in the production tubing is calculated for each production tubing, for each range of well depth associated with the each production tubing. The velocities may be calculated using one or more of the parameters discussed earlier, and are further calculated based on the determined lift gas loss parameters.

A graphical representation indicating the concentration of the tracer measured over the period of time may be provided for each production tubing in a multiple completion gas lift well. A lift gas loss parameter may be determined for each peak in each graphical representation. An area under each peak for each graphical representation is determined and the areas are summed to yield a total area. Then, a lift gas loss parameter is determined for each peak, which corresponds to a ratio of the area under the peak to the total area under all peaks for both graphical representations. In determining the lift gas parameter for a particular peak it is necessary to sum the areas of all peaks included in all graphical representations because lift gas is injected into a common annulus in a multiple completion well and enters the two or more production tubings from the common annulus.

Figure 6A:
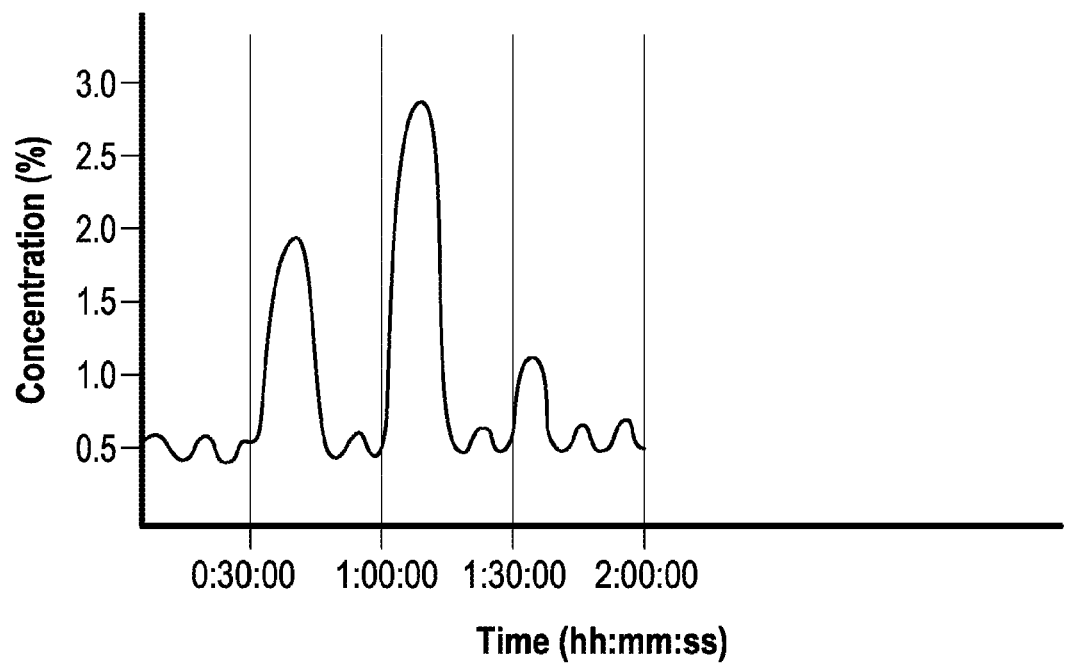
FIGS. 6A-6B depict sample graphical representations in accordance with one or more embodiments of the invention.
Figure 6B:
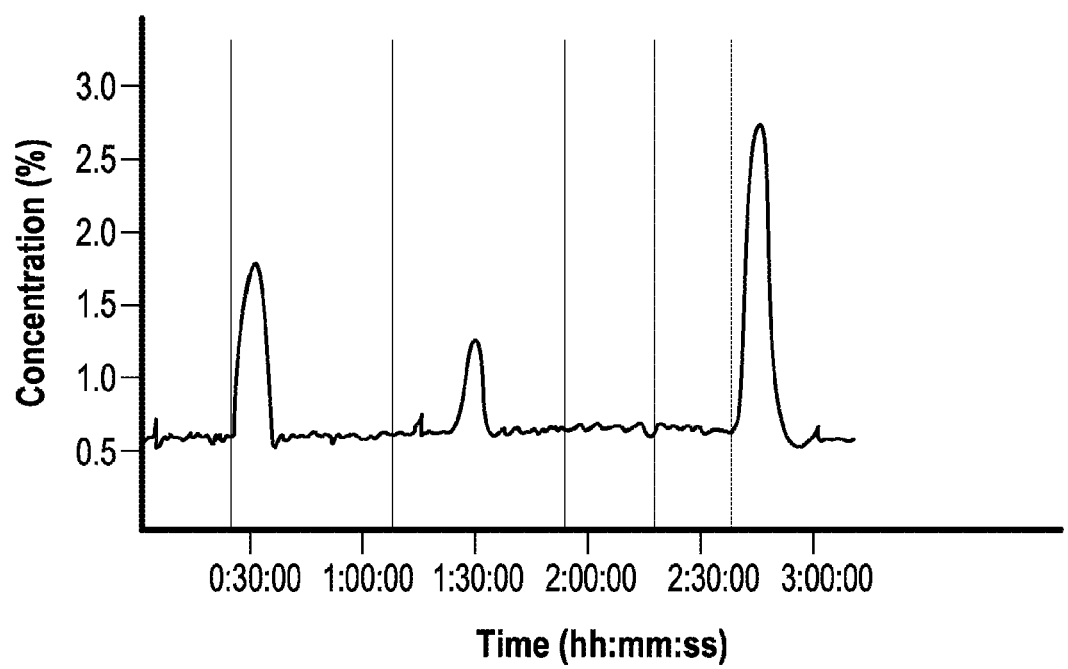

FIGS. 6A-6B depict sample graphical representations provided by a gas lift well surveillance kit in accordance with one or more embodiments of the invention. Each graph illustrates a continuous measurement of tracer concentration as a function of time. Vertical lines in each graph represent tracer travel times corresponding to each point of communication. The gas lift well that corresponds to the graph in FIG. 6A has four valves. A vertical line indicative of a travel time associated with each valve is included in the graph. As noted earlier, the travel time for each point of communication is calculated based on the lift gas loss parameters associated with each actual travel time of tracer (each point of entry). The graph in FIG. 6A includes three peaks. The baseline tracer concentration in FIG. 6A oscillates in a periodic sinusoidal manner. However, as discussed earlier, a regularity or periodicity in the baseline tracer concentration is not required. The graph in FIG. 6A provides a quick and efficient means for determining whether the peaks (points of entry of the lift gas into the production tubing) correspond to open valves or leaks in the production tubing. Visual examination of FIG. 6A indicates that the beginning of each peak coincides with a travel time for a point of communication. Thus, it can be determined that there are three points of entry of the lift gas into the production tubing, and the points of entry correspond to the three shallowest valves. The deepest valve does not appear to be operating. Further, there do not appear to be significant leaks of lift gas into the production tubing. The percentage of lift gas entering at each valve may be determined based on the lift gas loss parameters. That is, the percentage of lift gas entering at a particular point of entry corresponds to the ratio of the area under the peak associated with that point of entry to the total area under all peaks. From a visual inspection, it can quickly be determined that the percentage of lift gas entering through each valve in FIG. 6A is greatest for valve 2 and smallest for valve 3 (valve 1 being the valve with the shortest travel time).

FIG. 6B depicts a sample graphical representation corresponding to a different well configuration from that in FIG. 6A. The well represented by the graph in FIG. 6B includes five points of communication, which correspond to gas lift valves. As in FIG. 6A, vertical lines are present in the graph and indicate travel times calculated for each point of communication based on the velocities in the annulus and in the production tubing determined for each of the plurality of ranges of well depths based on one or more lift gas loss parameters. The tracer concentration has three peaks. In this graph, it is important to note that the baseline tracer concentration does not exhibit any regularity or periodicity. However, three peaks in the tracer concentration which correspond to actual travel times of the tracer and points of entry of the lift gas into the production tubing can be identified because the peaks represent deviations in a pattern present in the baseline tracer concentration. As discussed earlier, a pattern in the baseline tracer concentration may refer to any characteristic of the baseline tracer concentration that identifies it as such. In this example, the pattern in the baseline tracer concentration indicates small variation in the concentration that lacks any regularity. The peaks are identifiable as points of entry based on their deviation from the small variation present in the baseline tracer concentration.

Visual examination of the graph in FIG. 6B indicates peaks originating at the travel times associated with valves 1 and 5. Therefore, it can be concluded that valves 1 and 5 are operating and lift gas is entering the production tubing through these two valves. However, the second peak does not coincide with a travel time for any point of communication. Therefore, a possible conclusion is that a significant leak of lift gas into the production tubing is occurring at a well depth that corresponds to the point of entry represented by the second peak.

The computer program product (FIG. 1, 80) that is included in a gas lift well surveillance kit in accordance with one or more embodiments of the invention is configured to implement one or more of the previously described methods of the invention. For example, the computer program product includes instructions for calculating lift gas velocities in the annulus and in the production tubing using one or more complex models. The computer program product includes instructions for storing the annulus and production tubing parameters discussed earlier (also known as tubing string and casing string information) and using one or more of these parameters to determine lift gas velocities in the annulus and in the production tubing. Lift gas velocities in the production tubing may be calculated using a multiphase flow pressure model that includes various parameters related to the flow of gas in a multi-phase mixture. The computer program product may further include one or more user interface screens that provide a user with access to data and models. One or more graphs for studying the relationship between various parameters may be displayed through the one or more user interface screens. For example, the graphical representation of tracer concentration as a function of time has already been discussed. Plots or graphs indicating the relationship between the following parameters may also be displayed. Examples of such plots include, but are not limited to, Depth vs. Pressure, Depth vs. Temperature, Pressure vs. Production, Historical real-time data v. Time, Pressure v. Time, Flow Rates v. Time, and Pressure v. Injection.

In one or more embodiments of the invention, the computer program product includes instructions for analyzing fluctuating measurements and errors in measurements, validating and explaining tracer returns, analyzing the well from different points of view, viewing the well as a plot or tabular data of tracer concentration versus time while indicating expected travel times for each of the points of communication, calibrating the data to line actual travel times of the tracer with expected travel times calculated for each of the points of communication, checking the validity of the calibrations by viewing the well in other points of view (such as a plot or tabular depth versus pressure) to determine the expected injection points of the lift gas, and using high quality gas lift valve models to determine how much gas should pass through each valve.

For example, a graph of tracer concentration as a function of time may initially indicate a peak in tracer concentration that does not coincide with a particular point of communication. However, a plot of Depth v. Production Pressure may indicate a change in the slope of the curve at a well depth that corresponds to a particular point of communication. Thus, the Depth v. Pressure indicates that lift gas is entering through a particular valve even though the initial plot of tracer concentration v. time did not provide such an indication. By analyzing the data from a different point of view (i.e. the Depth v. Pressure curve), the actual travel times of the tracer and the parameters used to determine lift gas velocities in the annulus and in the production tubing may be calibrated to have the actual tracer travel times coincide with the appropriate points of communication in the tracer concentration v. time graph. Thus, viewing the data from multiple perspectives allows for the necessary calibration of the data.

Points of entry of the lift gas into the production tubing may also determined under unstable operating conditions. When unstable conditions exist, averages and/or weighted averages can be used to determine reasonable tracer travel times using SCADA data. SCADA data may refer to the one or more casing and tubing related parameters discussed earlier. In one or more embodiments of the invention, the computer program product includes instructions for determining weighted averages for measurements not measured by SCADA in order to obtain tracer travel time data.

In one or more embodiments of the invention, the gas lift well surveillance kit is used to record real time information during a preliminary well survey, which in turn is used to create complex models for the analysis of the tracer travel times and for overcoming data measurement issues in the field. The real time information includes the one or more parameters used to calculated light gas velocities in the annulus and in the production tubing. The real time information may include, for example, the injection rate, casing mechanical layout, injection pressure, injection temperature, lift gas specific gravity, total produced liquid rate, water cut, formation gas rate, well head pressure, production separator pressure and tracer concentration. Other information including mechanical data that includes tubing string, casing string and flowline information, installed mandrels and valves, lift gas properties, reservoir data, well test data, deviation data, and current gradient surveys may be used to properly model a well. Information captured during the preliminary well survey and SCADA data enable the accurate calculation of lift gas velocities in the annulus and in the production tubing, and thus, enable analysis of tracer return results with little to no calibration required.

It is contemplated that the embodiments described herein are used in any operation employing lift gases to determine proper well functioning. While the foregoing is directed to embodiments of the present invention, other and further embodiments of the invention may be devised without departing from the basic scope thereof and the scope thereof is determined by the claims that follow. The inventions are not limited to the described embodiments, versions or examples, which are included to enable a person having ordinary skill in the art to make and use the inventions when the information in this patent is combined with available information and technology.

What is claimed is:

1. A method for evaluating the performance of a gas lift well, the method comprising:

injecting a tracer into an annulus formed between a well casing and a production tubing of the gas lift well, the annulus including a lift gas, the gas lift well including one or more points of communication between the annulus and the production tubing, wherein each of the one or more points of communication corresponds to a valve position;

measuring, over a period of time, a concentration of the tracer present in a substance retrieved from the gas lift well;

determining one or more actual travel times of the tracer based on a deviation of the concentration of the tracer measured over the period of time from a pattern present in a baseline tracer concentration, wherein each of the one or more actual travel times of the tracer corresponds to a point of entry of one or more points of entry of the lift gas into the production tubing;

segmenting the gas lift well into a plurality of ranges of well depth;

determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry;

calculating a velocity of the lift gas in the annulus and a velocity of the lift gas in the production tubing for each of the plurality of ranges of well depth based on the one or more lift gas loss parameters; and determining the one or more points of entry of the lift gas into the production tubing based on:
(i) the one or more actual travel times of the tracer, and
(ii) the velocity of the lift gas in the annulus and the velocity of the lift gas in the production tubing that are calculated for each of the plurality of ranges of well depth, wherein one or more of the steps of the method are controlled by at least one computer processor executing one or more computer program instructions stored on at least one memory device operatively coupled to the at least one processor.

2. The method of claim 1, further comprising:
calculating a travel time of the tracer for each of the one or more points of communication between the annulus and the production tubing based on the velocity of the lift gas in the annulus and the velocity of the lift gas in the production tubing that are calculated for each of the plurality of ranges of well depth.

3. The method of claim 2, further comprising:
displaying a graphical representation on an output device of the concentration of the tracer measured over the period of time, the graphical representation indicating the travel time of the tracer calculated for each of the one or more points of communication between the annulus and the production tubing.

4. The method of claim 3, wherein:
on the condition that the graphical representation includes one or more peaks in the concentration of the tracer measured over the period of time, each of the one of more peaks corresponding to one of the one or more actual travel times, one of the one or more points of entry of the lift gas into the production tubing, and one of the one or more lift gas loss parameters, the one or more lift gas loss parameters being determined by:
(i) determining an area under each of the one or more peaks;
(ii) summing each area determined for each of the one or more peaks to obtain a total area; and
(iii) determining, for each of the one or more peaks, a ratio of the area under the each of the one or more peaks to the total area, the ratio representing the lift gas loss parameter corresponding to the each of the one or more peaks.

5. The method of claim 1, further comprising:
comparing the one or more determined points of entry of the lift gas to the one or more points of communication in order to determine, for each of the one or more determined points of entry of the lift gas, whether the point of entry corresponds to a leak of the lift gas into the production tubing or entry of the lift gas into the production tubing through a valve.

6. The method of claim 1, further comprising:
separating a gaseous phase from the substance retrieved from the gas lift well; and
measuring, over a period of time, a concentration of the tracer present in the gaseous phase.

7. The method of claim 1, wherein the velocity of the lift gas in the annulus is calculated for each of the plurality of ranges of well depth further based on at least one of:
(i) a plurality of pressures in the annulus, each of the plurality of pressures corresponding to one of the plurality of ranges of well depth,
(ii) a flow rate of the lift gas in the annulus,
(iii) an injection pressure of the lift gas,
(iv) a volume of the annulus per a unit of well depth,
(v) a temperature in the annulus,
(vii) a parameter that represents a frictional force opposing flow in the annulus, and
(viii) a parameter that represents an effect of gravity on flow in the annulus.

8. The method of claim 1, wherein the velocity of the lift gas in the production tubing is calculated for each of the plurality of ranges of well depth further based on at least one of:
(i) a plurality of pressures in the production tubing, each of the plurality of pressures corresponding to one of the plurality of ranges of well depth,
(ii) a flow rate of the lift gas in the production tubing,
(iii) a temperature in the production tubing,
(iv) a parameter that represents a frictional force opposing flow in the production tubing,
(v) a parameter that represents an effect of gravity on flow in the production tubing,
(vi) a ratio of a gaseous phase to a non-gaseous phase in the substance retrieved from the gas lift well,
(vii) a flow rate of one or more gases present in the substance retrieved from the gas lift well,
(viii) a flow rate of one of more liquids present in the substance retrieved from the gas lift well,
(ix) a well head pressure, and
(x) a separator pressure.

9. The method of claim 1, wherein a velocity of the lift gas in the annulus for a second range of the plurality of ranges of well depth is calculated further based on a temperature in the annulus and a pressure in the annulus that correspond to a first range of the plurality of ranges of well depth.

10. The method of claim 1, further comprising:
determining values for at least two parameters in the annulus for an initial range of well depth of the plurality of ranges of well depth;
calculating a velocity of the lift gas in the annulus for the initial range of well depth based on the determined values of the at least two parameters for the initial range of well depth;
identifying one or more successive ranges of well depth; and
performing an iterative cycle, the iterative cycle including:
determining whether a velocity of the lift gas in the annulus has been calculated for each of the identified ranges of well depth; and
on the condition that a velocity of the lift gas in the annulus has not been calculated for each of the identified ranges of well depth:
selecting, based on predetermined criteria, a range of well depth from among the identified ranges of well depth for which the velocity of the lift gas in the annulus has not been calculated;
determining values for the at least two parameters in the annulus for the selected range of well depth, and
calculating a velocity of the lift gas in the annulus for the selected range of well depth based on the determined values for the at least two parameters for the selected range of well depth,
wherein the iterative cycle is repeated and ends on the condition that it is determined that a velocity of the lift gas in the annulus has been calculated for each of the identified ranges of well depth,
calculating a velocity of the lift gas in the annulus and determining the one or more parameters in the annulus for each of the one or more identified successive ranges of well depth further based on a velocity of the lift gas in the annulus and the one or more determined parameters that correspond to a range of well depth that immediately precedes the each of the one or more successive ranges of well depth.

11. The method of claim 1, wherein the velocity of the lift gas in the production tubing is calculated using a multi-phase flow pressure model.

12. A method for evaluating the performance of a gas lift well, the method comprising:
- injecting a tracer into an annulus formed between a well casing and a production tubing of the gas lift well, the annulus including a lift gas, the gas lift well further including one or more points of communication between the annulus and the production tubing, wherein each of the one or more points of communication corresponds to a valve position;
- measuring, over a period of time, a concentration of the tracer present in a substance retrieved from the gas lift well;
- determining one or more actual travel times of the tracer based on a deviation of the concentration of the tracer measured over the period of time from a pattern present in a baseline tracer concentration, wherein each of the one or more actual travel times of the tracer corresponds to a point of entry of one or more points of entry of the lift gas into the production tubing;
- segmenting the gas lift well into a plurality of ranges of well depth;
- determining one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry;
- calculating a velocity of the lift gas in the annulus and a velocity of the lift gas in the production tubing for each of the plurality of ranges of well depth based on:
  (i) the one or more lift gas loss parameters, and
  (ii) a plurality of pressures, each of the plurality of pressures corresponding to one of the plurality of ranges of well depth; and
- determining the one or more points of entry of the lift gas into the production tubing based on:
  (i) the one or more actual travel times of the tracer, and
  (ii) the velocity of the lift gas in the annulus and the velocity of the lift gas in the production tubing calculated for each of the plurality of ranges of well depth,
- wherein one or more of the steps of the method are controlled by at least one computer processor executing one or more computer program instructions stored on at least one memory device operatively coupled to the at least one processor.

13. A method for evaluating the performance of a multiple installation gas lift well, the method comprising:
- injecting a tracer into an annulus formed between a well casing and two or more production tubings of the gas lift well, the annulus including a lift gas, the two or more production tubings being capable of fluid communication with the annulus and being substantially incapable of fluid communication with each other, the gas lift well further including one or more points of communication between the annulus and each of the two or more production tubings, wherein each of the one or more points of communication corresponds to a valve position; and
- for each of the two or more production tubings:
  - measuring, over a period of time, a concentration of the tracer present in a substance retrieved from the each of the two or more production tubings;
  - determining one or more actual travel times of the tracer based on a deviation of the concentration of the tracer measured over the period of time from a pattern present in a baseline tracer concentration, wherein each of the one or more actual travel times of the tracer corresponds to a point of entry of one or more points of entry of the lift gas into the each of the two or more production tubings;
- segmenting the gas lift well into a plurality of ranges of well depth;
- determining one or more lift gas loss parameters, each of the one or more lift gas parameters corresponding to a point of entry, each of the one or more lift gas loss parameters accounting for an effect of entry of a portion of the tracer into the each of the two or more production tubings at the corresponding point of entry on the actual travel time of the tracer that enters the each of the two or more production tubings at each point of entry located at a depth greater than the corresponding point of entry;
- calculating a velocity of the lift gas in the annulus and a velocity of the lift gas in the each of the two or more production tubings for each of the plurality of ranges of well depth based on the one or more lift gas loss parameters; and
- determining the one or more points of entry of the lift gas into the each of the two or more production tubings based on:
  (i) the one or more actual travel times of the tracer, and
  (ii) the velocity of the lift gas in the annulus and the velocity of the lift gas in the each of the two or more production tubings calculated for each of the plurality of ranges of well depth,
- wherein one or more of the steps of the method are controlled by at least one computer processor executing one or more computer program instructions stored on at least one memory device operatively coupled to the at least one processor.

14. A non-transitory computer-readable medium storing a computer program for evaluating the performance of a gas lift well that includes a well casing, a production tubing, an annulus formed between the well casing and the production tubing, the annulus including a lift gas, and one or more points of communication between the annulus and the production tubing, wherein each of the one or more points of communication corresponds to a valve position, the computer program comprising computer program instructions for:
- measuring, over a period of time, a concentration of the tracer present in a substance retrieved from the gas lift well;
- determining one or more actual travel times of the tracer based on a deviation of the concentration of the tracer measured over the period of time from a pattern present in a baseline tracer concentration, wherein each of the one or more actual travel times of the tracer corresponds to a point of entry of one or more points of entry of the lift gas into the production tubing;
- segmenting the gas lift well into a plurality of ranges of well depth;
- determining the one or more lift gas loss parameters, each of the one or more lift gas parameters corresponding to a point of entry, each of the one or more lift gas loss parameters accounting for an effect of entry of a portion of the tracer into the production tubing at the corresponding point of entry on the actual travel time of the tracer that enters the production tubing at each point of entry located at a depth greater than the corresponding point of entry;

calculating a velocity of the lift gas in the annulus and a velocity of the lift gas in the production tubing for each of the plurality of ranges of well depth based on the one or more lift gas loss parameters; and determining the one or more points of entry of the lift gas into the production tubing based on:
(ii) the one or more actual travel times of the tracer, and
(ii) the velocity of the lift gas in the annulus and the velocity of the lift gas in the production tubing, that are calculated for each of the plurality of ranges of well depth.

15. The computer-readable medium of claim 14, wherein the program further comprises instructions for:
calculating a travel time of the tracer for each of the one or more points of communication between the annulus and the production tubing based on the velocity of the lift gas in the annulus and the velocity of the lift gas in the production tubing calculated for each of the plurality of ranges of well depth.

16. The computer-readable medium of claim 14, wherein the computer program further comprises instructions for:
comparing the one or more determined points of entry of the lift gas to the one or more points of communication in order to determine, for each of the one or more determined points of entry of the lift gas, whether the point of entry corresponds to a leak of the lift gas into the production tubing or entry of the lift gas into the production tubing through a valve.

17. The computer-readable medium of claim 15, further comprising:
a user interface through which a user inputs data to the computer program and through which the computer program is configured to display output data.

18. The computer-readable medium of claim 17, wherein the computer program further comprises instructions for:
displaying, through the user interface, a graphical representation of the concentration of the tracer measured over the period of time, the graphical representation indicating the travel time of the tracer calculated for each of the one or more points of communication between the annulus and the production tubing.

19. The computer-readable medium of claim 14, wherein the computer program further comprises instructions for:
calculating the velocity of the lift gas in the annulus for each of the plurality of ranges of well depth further based on at least one of:
(i) a plurality of pressures in the annulus, each of the plurality of pressures corresponding to one of the plurality of ranges of well depth,
(ii) a flow rate of the lift gas in the annulus,
(iii) an injection pressure of the lift gas,
(iv) a volume of the annulus per a unit of well depth,
(v) a temperature in the annulus,
(vii) a parameter that represents a frictional force opposing flow in the annulus, and
(viii) a parameter that represents an effect of gravity on flow in the annulus.

20. The computer-readable medium of claim 14, wherein the computer program further comprises instructions for:
calculating the velocity of the lift gas in the production tubing for each of the plurality of ranges of well depth further based on at least one of:
(i) a plurality of pressures in the production tubing, each of the plurality of pressures corresponding to one of the plurality of ranges of well depth,
(ii) a flow rate of the lift gas in the production tubing,
(iii) a temperature in the production tubing,
(iv) a parameter that represents a frictional force opposing flow in the production tubing,
(v) a parameter that represents an effect of gravity on flow in the production tubing,
(vi) a ratio of a gaseous phase to a non-gaseous phase in the substance retrieved from the gas lift well,
(vii) a flow rate of one or more gases present in the substance retrieved from the gas lift well,
(viii) a flow rate of one of more liquids present in the substance retrieved from the gas lift well,
(ix) a well head pressure, and
(x) a separator pressure.

21. The computer-readable medium of claim 14, the computer program further comprising instructions for:
calculating a velocity of the lift gas in the annulus for a second range of the plurality of ranges of well depth further based on a temperature in the annulus and a pressure in the annulus that correspond to a first range of the plurality of ranges of well depth.

22. The computer-readable medium of claim 14, wherein:
the velocity of the lift gas in the production tubing is calculated using a multi-phase flow pressure model.

23. A gas lift well surveillance kit comprising:
components for evaluating the performance of a gas lift well, the components including:
a separator;
a tracer measurement device;
a device for sensing and measuring pressure and temperature;
a flow regulation device;
a data collection and storage device; and
the non-transitory computer-readable medium of claim 14.

24. The gas lift well surveillance kit of claim 23, further comprising at least one of a power source, a pressure gauge, and tubing for connecting the gas lift well surveillance kit to the gas lift well.

25. The gas lift well surveillance kit of claim 23, wherein at least one of: the tracer measurement device is a spectrometer, the data collection and storage device is a datalogger, and the device for sensing pressure and temperature is a transducer.

* * * * *